May 27, 1941. F. W. WENDELBURG ET AL 2,243,590
REGENERATIVE AND COUNTERTORQUE BRAKING CONTROLLER
Filed Dec. 4, 1939 2 Sheets-Sheet 1

INVENTORS
Frank W. Wendelburg
Roy J. Wadd
BY
Louis Quarles
ATTORNEY.

May 27, 1941.    F. W. WENDELBURG ET AL    2,243,590
REGENERATIVE AND COUNTERTORQUE BRAKING CONTROLLER
Filed Dec. 4, 1939    2 Sheets-Sheet 2
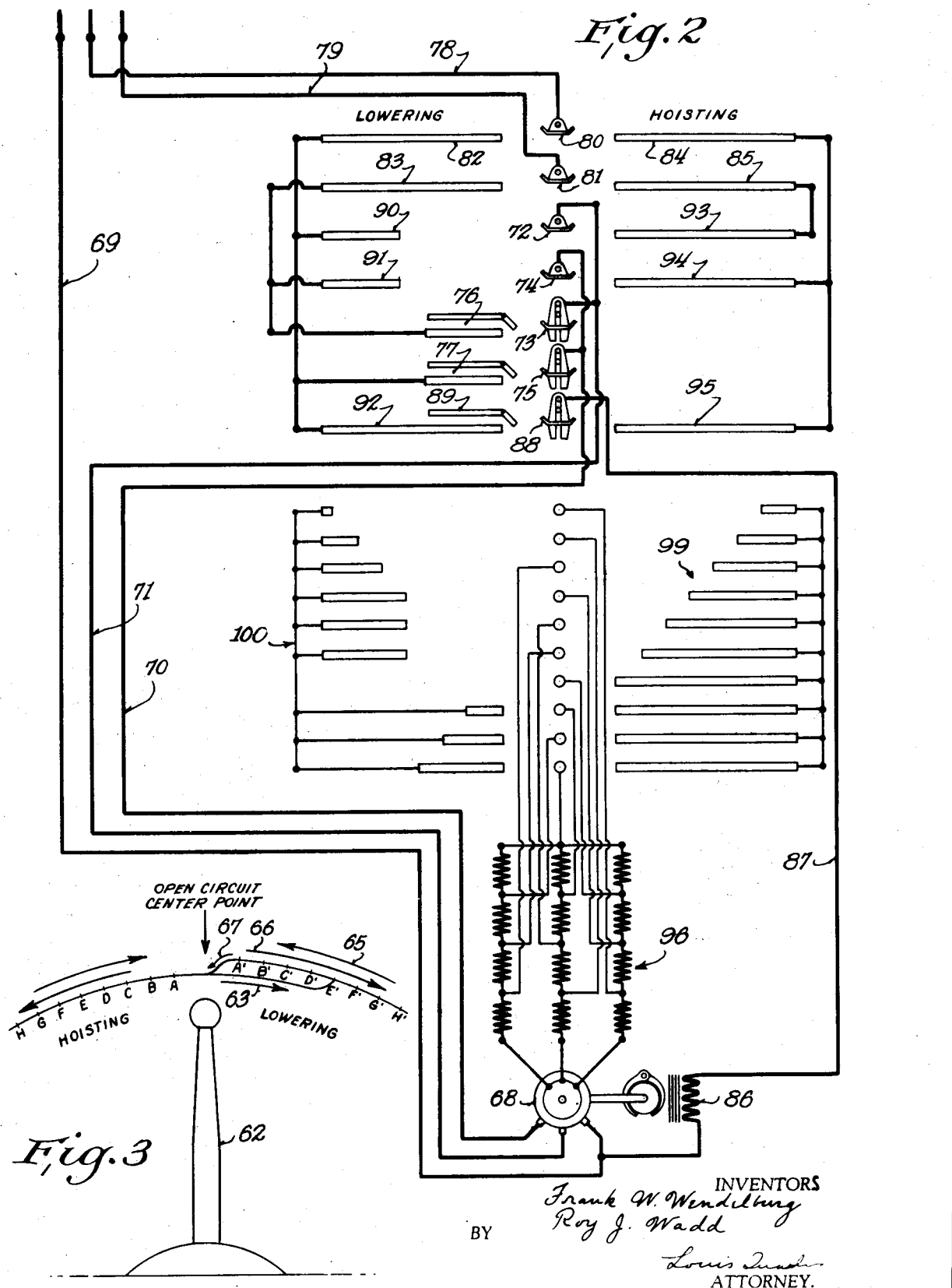

Patented May 27, 1941

2,243,590

UNITED STATES PATENT OFFICE 2,243,590

REGENERATIVE AND COUNTERTORQUE BRAKING CONTROLLER

Frank W. Wendelburg and Roy J. Wadd, Milwaukee, Wis., assignors to Harnischfeger Corporation, Milwaukee, Wis., a corporation of Wisconsin Application December 4, 1939, Serial No. 307,456

3 Claims. (Cl. 172—179)

This invention relates to circuits for controlling and braking alternating current induction motors and it resides in a novel form of circuit by which there is obtained continuity of switching sequence between regenerative and counter-torque braking, a property not heretofore exhibited by circuits for alternating current motors. With the circuit connections of this invention the operator may control paying out under load at a high rate of speed under regenerative braking and then check the rate of speed with any degree of counter-torque braking desired without the interposition of mechanical friction braking at the transition point and transition from counted-torque to regenerative braking may be made at will without the interposition of mechanical friction braking at the transition point and the transition from one to the other and back again may be repeated as freely and as often as desired.

Heretofore in the art polyphase, wound rotor induction motors with speed control by step-by-step variation of secondary resistance have been employed for load lifting duty. To control lowering of the load with such motors two systems have been employed. The first involves the use of regenerative braking. In this system means are provided for reversing the primary rotation by which, depending upon the secondary resistance selected, lowering speeds, but only those in excess of synchronous speed, may be selected. The second method of lowering involves the use of counter-torque. In this system the same primary rotation employed for hoisting is maintained and secondary resistances high enough to permit the load to overcome the lifting torque to any degree desired are selected. In this system, lowering speeds of any degree, including dead stop, may be obtained, but counter-torque braking when used for continuous duty is attended by substantial energy losses and unnecessary heating.

In an effort to obtain a combination of the advantages of each of the foregoing systems, some have heretofore in the art provided a controller which may be moved so as to connect the motor for hoisting, regenerative lowering, or counter-torque lowering. In such systems return to open circuit center point, where a mechanical friction solenoid brake is applied to a drum, is necessary each time a transition from one form of braking to the other takes place. It is apparent in such systems that a load dropping rapidly under control of regenerative braking cannot be cushioned and checked by counter-torque braking without the mechanical shock of first passing through the open circuit center point position where the solenoid brake becomes applied. The abrupt mechanical arresting of the load by the solenoid brake, which becomes applied in advance of the counter-torque braking, thus deprives counter-torque braking of its chief advantage, namely, its smooth electrical cushioning action. By reason of these limitations and others existing in prior structures, no major success has been experienced prior to this invention by those attempting to make available counter-torque and regenerative braking with alternating current loadlifting machinery. As a result, direct current machinery has continued to be used where nicety of control is essential. Through this invention, however, prior existing limitations have been avoided and a highly versatile control provided.

In aid of the description of this invention and by way of illustration and not of limitation, instances of embodiments of this invention are herein set forth and particularly described with the aid of the accompanying drawings, which form a part hereof.

In the drawings—

Fig. 2 is a circuit diagram of a somewhat simplified form of the apparatus of this invention; and Fig. 3 is a diagrammatic showing of the control cycle through which a controller handle of an apparatus of this invention will pass.

Figure 1:
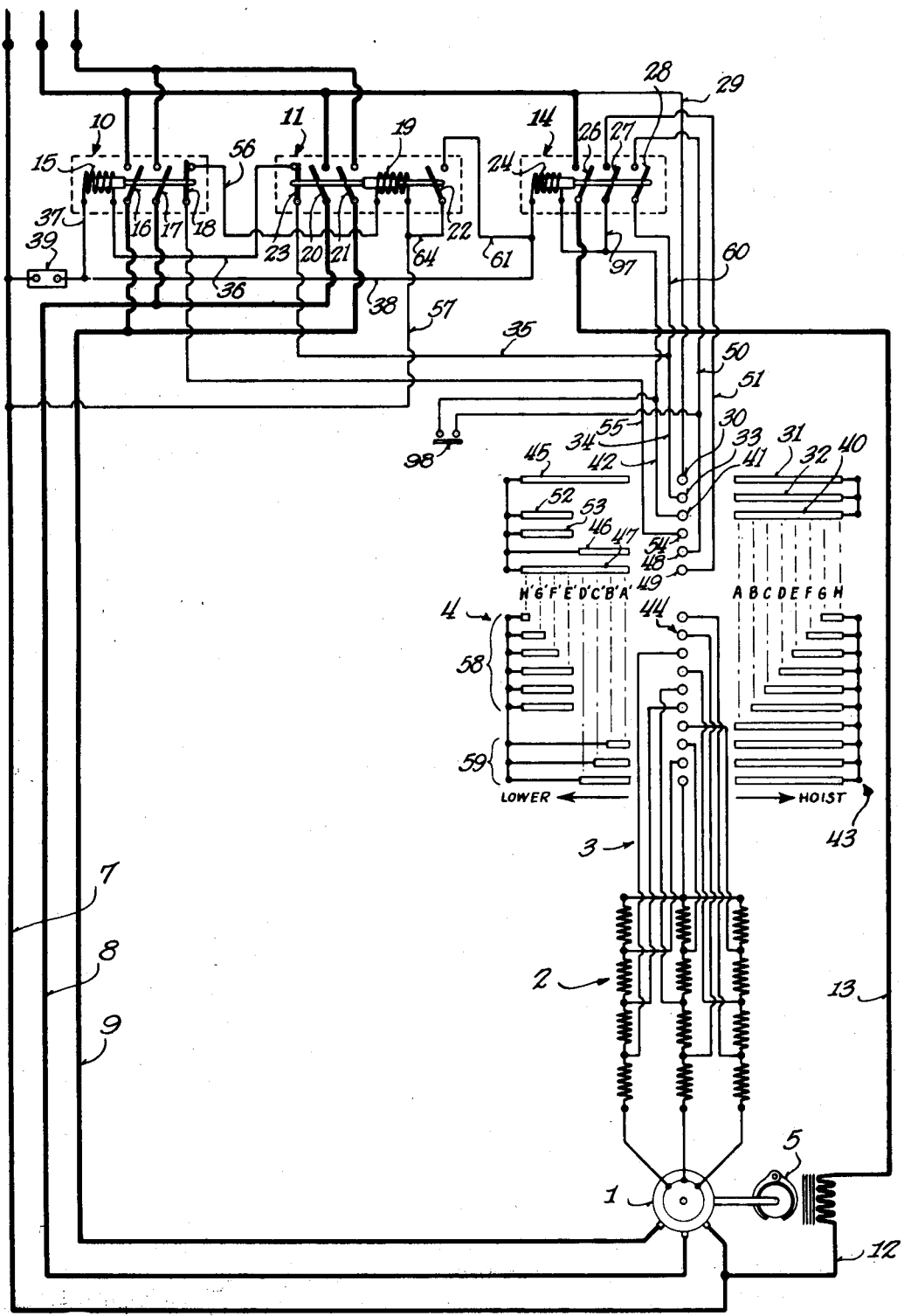
Fig. 1 is a circuit diagram of one suitable form of the apparatus of this invention.

In Fig. 1 there is set forth a circuit diagram of a form of the apparatus of this invention suitable for use with motors of moderate power and employing magnetic switching in the primary circuit thereof. A three-phase wound rotor induction motor is indicated at 1. An adjustable external resistance 2 is connected as shown in the secondary circuit of the motor 1 and is provided with taps 3 leading to a controller 4 for a purpose hereinafter to be more fully described. A magnetically-actuated friction brake 5 is mounted to act as shown upon the shaft of motor 1. A primary lead 7 leads directly from the motor 1 to a line connection, as shown, while the primary leads 8 and 9 of motor 1 lead to the magnetic contactors 10 and 11, which together constitute a magnetically-actuated load lead reverser through which the sense of rotation of the primary of motor 1 may be reversed.

The magnetically-actuated brake 5 is provided with a lead 12, which is in direct connection with lead 7 and thus in permanent connection with the line. The opposite side of brake 5 is connected through a lead 13 to brake and interlock relay 14, through which line supply is derived, as shown.

Magnetic contactor 10 is arranged to admit load current to the primary of motor 1 to produce forward rotation thereof and is provided with a forward closing coil 15 arranged to act upon normally open load contactors 16 and 17 and normally closed interlock contactor 18. The magnetically-actuated contactor 11 is arranged to produce reverse rotation of the primary of motor 1 and is provided with reverse closing coil 19, arranged to act upon normally open load contactors 20 and 21, normally open interlock contactor 22, and normally closed interlock contactor 23.

Relay 14 serves to control the admission of current to brake 5 and additional purposes to be hereinafter described and is provided with relay closing coil 24, arranged to act upon normally open brake contactor 26 and normally open interlock contactors 27 and 28.

If it be assumed that motor 1 is applied to a hoisting or load-lifting duty, hoisting movement may be brought about by application of line supply to the primary of motor 1 through forward contactor 10 and in order to accomplish this, control current is drawn through supply lead 29 to a controller contactor finger 30, which is brought into contact with controller segment 31 arranged on the hoisting side of the controller 4, which may be moved in the well-known manner for that purpose. From segment 30 current passes through segment 32, contact finger 33, leads 34 and 35, to interlock contactor 23, which will be found closed with the controller 4 in the position now under consideration. Connection from interlock contactor 23 is then made through lead 36 with forward closing coil 15, which in turn is connected through lead 37, common return lead 38, and limit switch 39 to lead 7, which is in direct connection with the line. Forward closing coil 15 is thus energized and forward current supply is furnished to motor 1.

To provide for release of brake 5 while load current is being provided to motor 1, as above described, a controller segment 40 is provided, which comes into contact with a corresponding contactor finger 41 simultaneously with the engagement of segments 31 and 32 with their respective contactor fingers. Control current is thus supplied through lead 42 to closing coil 24 of relay 14 and from coil 24 return to the opposite line connection is made through common return lead 38, limit switch 39 and lead 7, previously described.

With the controller 4 in any of the several selected controller hoisting positions indicated by the latters A to H, inclusive, adjusted amounts of external resistance 2 are placed in the secondary circuit of motor 1 through cooperation of the segment group 43 with corresponding contactor fingers contained in contactor finger group 44 in the well-known manner. Upon the return of the controller to the open circuit center point position closing coil 15 becomes deenergized and contactors 16 and 17 open. At the same time closing coil 24 of relay 14 becomes deenergized and brake 5 applied.

In order to perform a lowering operation, the controller 4 is moved so as first to bring into contact with respective contactor fingers controller segments 45, 46 and 47. This initial movement of the controller 4 is in a sense a preparatory movement, since it will be observed that segments 46 and 47 coming respectively into contact with fingers 48 and 49 do not serve to form a completed control circuit through leads 50 and 51 by reason of the open condition of contactors 27 and 28 of relay 14 and this condition prevails until controller 4 has been moved in the lowering direction to position E' indicated. Upon reaching position E' controller segment 52 comes into engagement with contactor finger 41, whereupon control current is supplied, as previously described, to closing coil 24 of relay 14. Simultaneously with this action a supplementary supply of control current for maintaining relay 14 in closed position becomes established through segment 47, contact finger 49, lead 51, contactor 27 and lead 97, so that relay 14 will remain closed so long as segment 47 remains in contact with contact finger 49, even after separation of segment 52 from contactor finger 41.

Controller 4 is also furnished with a segment 53 which comes into contact with a corresponding contact finger 54 when position E' of the lowering stroke of controller 4 is reached and in this manner control current is supplied through lead 55, contactor 18 (which will be found closed with the controller in the position now under discussion), and lead 56 to closing coil 19 of reverse contactor 11. Return connection to the line from closing coil 19 is established through the return lead 57. The coil 19 being thus energized, line connection for reverse rotation of the primary of motor 1 is established through leads 8 and 9, which become connected to the line through contactors 20 and 21. Thereafter any of the positions E', F', G', or H' may be selected to bring about regenerative lowering of the load at selected terminal speeds in excess of synchronous speed, such variation in speed being produced by selective engagement of segments contained in segment group 58 with corresponding contactor fingers contained in contactor finger group 44, by means of which selected amounts of external resistance 2 are provided in the secondary circuit of motor 1.

To check the rate of descent of the load under regenerative lowering, which will be a relatively high rate, the controller may then be shifted to one of the positions A', B', C', or D'. In so doing, controller segment 46 comes into engagement with contactor finger 48, thus furnishing a supply of control current which passes through lead 50, contactor finger 28, lead 60, lead 35, contactor 23, and lead 36 to closing coil 15, and thence through the return lead 37 and limit switch 39 to the line lead 7. Completion of this circuit is rendered possible by disengagement of segment 53 from its respective contactor finger 54, which de-energizes closing coil 19 and causes reverse contactor 11 to open, thus closing the normally closed contact 23. Line current is thus supplied to the primary of motor 1 in such manner as to produce forward rotation thereof and to produce torque which resists downward travel of the load. The degree to which downward movement of the load is resisted will depend upon which of the controller positions, A', B', C', or D', is selected and which of the segments contained in control segment group 59 remain in contact with their respective contactor fingers contained in group 44.

As previously explained, supplementary control current supply once established through segment 47 remains effective throughout all lowering positions of the controller 4 and for this reason transition from regenerative lowering to counter-torque lowering can be made at will and, conversely, the transition from counter-torque lowering to regenerative lowering may be made without an intervening stoppage of motor 1 or application of brake 5. From the above it will be further observed that lowering movement of the load can be produced only by first entering the regenerative lowering section of controller 4, but once such entry is made, immediate transition to counter-torque action may be had, if desired, and unlimited freedom of transition from counter-torque to regenerative action and back again is available until the controller is again moved to open circuit center point position, whereupon magnetically-controlled friction brake 5 acts to stop the motor. Controller 4 may thus be said to have an open circuit center point position, a hoisting zone, and a lowering zone comprising a counter-torque section adjacent said open circuit center position and a regenerative lowering section beyond said counter-torque section. If a situation should arise in which it is desirable to enter the counter-torque section directly, push button 98 is provided for this purpose.

The scope of action of a controller handle suitable for control of controller 4 is diagrammatically depicted in Fig. 3, wherein there is shown a conventional controller handle 62 arranged for arcuate movement. The handle 62 is shown in open circuit center position, in which position solenoid brake 5 is applied. To the left of handle 62, as indicated by arcuate lines and arrows, is the hoisting zone containing selective hoisting speeds A to H, inclusive. To the right of the handle 62 are shown the counter-torque positions A', B', C', and D', arranged along an arcuate line, and the regenerative lowering positions E', F', G', and H', arranged along the same arcuate line. To indicate the entrance of control into any of the lowering positions, the arrow 63 is applied to Fig. 3 so as to join with the regenerative lowering position E'. The arrows 65 and 66 are applied to the figure to indicate complete freedom of selection of lowering position after entrance through position E'. Reentrance of open circuit center position is through the path indicated by the arrow 67. If desired, external resistance corresponding to counter-torque position A' may be so selected that sufficient counter-torque to bring a certain predetermined load to dead stop may be provided. Great smoothness and precision of control may thus be obtained through the use of a single, easily manipulated and naturally responding control handle.

If, by accident, hoisting is carried to the point where limit switch 39 is opened, the brake 5 may nevertheless be released and lowering accomplished by moving the controller 4 into lowering position E', or beyond, since the closing of reverse contactor 11 causes contactor 22 to close, thus furnishing, through line 61 and lead 64, a supplementary return lead connection for relay closing coil 24 through lead 57 and line lead 7.

While the use of magnetically-actuated contactors as described above in connection with controller 4, as shown in Fig. 1, is distinctly desirable where motors of substantial power are controlled, a direct action controller may be employed in the circuit of this invention, as shown in Fig. 2. In this case a conventional three-phase, wound rotor induction motor 68 may be employed, the primary of which may be supplied through line lead 69 and through reversing leads 70 and 71 which connect said primary for forward or reverse rotation by contactor fingers 72 and 74 on the one hand and for forward rotation by contactor fingers 73 and 75 on the other. Contactor fingers 72 and 74 are of conventional form, while contactor fingers 73 and 75 are cam-shaped and free to move with a limited vertical movement so that insulating deflector shoes above segments 76 and 77 may engage the same upon their upper insulated faces during inward movement and upon the electrical contacting faces of segments 76 and 77 during outward movement, having first passed around the end of said deflectors, and thus supply primary current to the field of motor 68 for forward rotation thereof. Power supply for the controller enters through leads 78 and 79, which lead to contact fingers 80 and 81, through which power supply is brought to segments 82 and 83 when the controller is moved into the lowering zone and through segments 84 and 85 when the controller is moved into the hoisting zone. A magnetically-actuated brake 86 is supplied through lead 87, the latter being in electrical contact with cam contact finger 88 arranged to engage an insulated deflector shoe 89 upon initial movement into the lowering zone of the controller until reverse field segments 90 and 91 come into engagement with contactor fingers 72 and 74, respectively. Thereafter the contact finger 88 will ride continuously upon the surface of brake release segment 92 until the controller is brought to open circuit center position. With the controller moved into the hoisting zone, primary supply is established through segments 93 and 94 and brake 86 is released through current supplied directly through segment 95. The secondary of motor 68 is provided with adjustable external resistance 96, arranged to be adjustably varied in keeping with varying positions of the controller by means of segment groups 99 and 100, as shown.

From the foregoing it will be observed that a useful and versatile control system has been provided and that while specific embodiments thereof have been illustrated and described, the advance in the art represented thereby is capable of embodiment in varying forms. It is, therefore, intended that the protection of Letters Patent granted hereon be not unnecessarily limited by the above description, but that the same shall extend to the limits of the inventive advance disclosed herein and as set forth in the claims hereto appended.

What we claim as our invention is:

1. In an electric braking control for induction motors, the combination comprising a magnetically-actuated load lead reverser having a forward closing coil, a reverse closing coil, and an open circuit rest position, an induction motor, means providing for forward and reverse rotation of the primary of said motor under control of said load lead reverser, a magnetically-actuated friction brake for arresting movement for said motor; a magnetically-actuated relay having a coil for closing the same, a pair of closable contacts for controlling said brake, a pair of closable maintaining contacts for maintaining said relay in closed position, and a pair of closable counter-torque contacts controlling a path of current supply to the forward coil of said load lead reverser, a movable controller movable through a lowering stroke and a hoisting stroke and having an open circuit center point position, said controller having a plurality of segments energizable during the lowering stroke of said controller, one of which segments extends throughout the scope of lowering movement of said controller forming a supply connection to said relay-maintaining contacts, another of which segments extends through a portion of the scope of lowering movement of said controller spaced from said controller center point forming a supply connection to said relay-closing coil, another of which segments is coextensive with the segment next preceding forming a supply connection to said load lead reverser reverse coil, and another of which segments subtends the space lying between the two next preceding segments and said controller center point forming a supply connection to said relay counter-torque contacts and thus to the forward coil of said load lead reverser when said relay coil is energized, leads forming return line connections for said load lead reverser coils and said relay coil, and means for establishing forward driving connection to said motor during said hoisting stroke of said controller.

2. In an electric braking control for induction motors, the combination comprising a magnetically-actuated load lead reverser having a forward closing coil, a reverse closing coil, and an open circuit rest position; means for precluding simultaneous energizing of both of said coils; an induction motor; means providing for forward and reverse rotation of the primary of said motor under control of said load lead reverser; a magnetically-actuated friction brake for arresting movement of said motor; a magnetically-actuated relay having a coil for closing the same, a pair of closable contacts for controlling said brake, a pair of closable maintaining contacts for maintaining said relay in closed position, a pair of closable counter-torque contacts furnishing a path of current supply to the forward coil of said load lead reverser, a movable controller movable through a lowering stroke and a hoisting stroke having an open circuit center point position, said controller having a plurality of segments energizable by a line connection during the lowering stroke thereof, one of which segments extends throughout the lowering stroke of said controller forming a supply connection to said relay-maintaining contacts, another of which segments extends through a portion of the scope of movement of said controller spaced from said controller center point forming a supply connection to said relay-closing coil, another of which segments is coextensive with the segment next preceding forming a supply connection to said load lead reverser reverse coil, and another of which segments subtends the space lying between the two next preceding segments and said controller center point forming a supply connection to said relay counter-torque contacts and thus to the forward coil of said load lead reverser when said relay coil is energized, a lead forming a return line connection for said forward load lead reverser coil and said relay coil, a limit switch in said lead, a direct lead forming a return line connection for said load lead reverser reverse coil, a lead in addition to that which passes through said limit switch for forming a return lead connection for said brake and interlock coil, rendered operative when said load lead reverser reverse coil is energized, and means for establishing forward driving connections to said motor during the hoisting stroke of said controller.

3. In a control circuit for alternating current induction motors suitable for load lifting and and lowering and the like, the combination which comprises a motor having a primary and a secondary winding, a magnetically-actuated brake for arresting movement of said motor, a group of contact segments, a group of contact fingers positioned for engagement with corresponding segments upon relative movement between said groups, said segments and said fingers cooperating to constitute a controller having an open circuit center point position, a counter-torque zone extending from and adjacent to said open circuit center point position on one side thereof, a regenerative braking zone extending in the same direction from and adjacent to said counter-torque zone, a hoisting zone extending from and adjacent to said open circuit center point position on the opposite side thereof, said controller segments including a brake and relay keeper segment contacted by a finger throughout the regenerative and counter-torque zones, a brake and relay closer segment contacted by a finger throughout the regenerative zone only, a reverse field regenerative lowering segment contacted by a corresponding finger throughout the regenerative zone only, a forward field counter-torque segment contacted by a finger throughout the counter-torque zone only, a second forward field hoisting segment contacted by a corresponding finger throughout the hoisting zone, a direct brake segment contacted by a corresponding finger throughout the hoisting zone, a brake circuit controlling means actuated by engagement of said brake and relay keeper segment and said brake and relay closer segment with their respective fingers for releasing and maintaining said solenoid brake in released condition until disengagement of said brake and relay keeper segment from its corresponding finger, additional means for controlling said brake actuated by engagement of said direct brake segment with its corresponding finger throughout said hoisting zone, means actuated by engagement of said reverse field regenerative lowering segment with its corresponding finger for applying line connections to said motor primary to produce reverse rotation thereof, means actuated by engagement of said forward counter-torque field segment with its corresponding finger after precedent engagement of said reverse field regenerative lowering segment with its corresponding finger for applying line connections to said motor primary to produce forward rotation thereof, means actuated by engagement of said forward hoisting field segment with its corresponding finger for applying line connections to said motor primary to produce forward rotation thereof, external variable resistance connected to said motor secondary circuit, and means for varying said resistance actuatable in a predetermined manner in company with relative movement between segment and finger groups.

FRANK W. WENDELBURG.
ROY J. WADD.